April 21, 1936.  E. CHANDONIA  2,037,759
BAKEPAN UNIT
Filed March 7, 1935
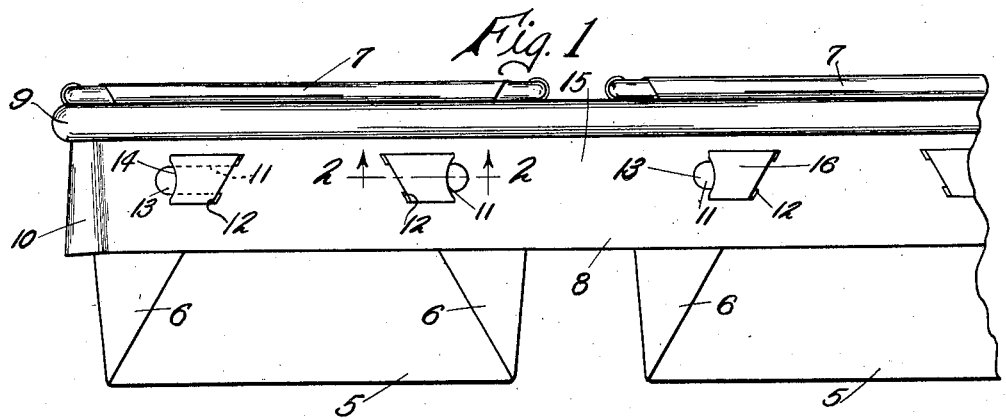
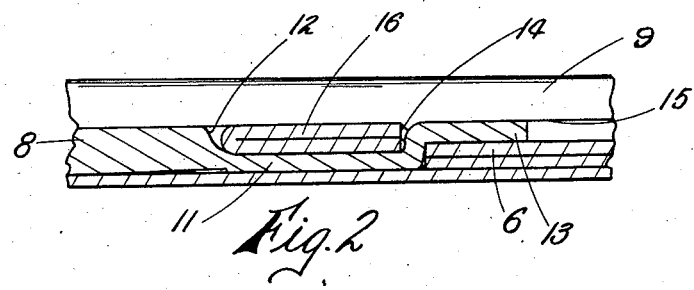
Inventor
Elmer Chandonia
By Murray and Zugelter
Attorney Patented Apr. 21, 1936

2,037,759

UNITED STATES PATENT OFFICE 2,037,759

BAKEPAN UNIT

Elmer Chandonia, Cincinnati, Ohio, assignor to The Lockwood Manufacturing Co., Cincinnati, Ohio, a corporation of Ohio Application March 7, 1935, Serial No. 9,816

6 Claims. (Cl. 53—6)

This invention relates to a container or pan unit and is particularly concerned with a bake pan unit such as is normally utilized in bakeries and the like in the quantity production of baked goods.

An object of the invention is to provide a bake pan unit having connecting means between the pans adapted to permit contraction and expansion of the parts of the unit and yet joining the pans in locked relationship.

Another object is to provide a bake pan unit and connecting means of the kind described in which rivets and other rigid connections are obviated.

Another object is to provide a bake pan unit in which the connection means between the pans are adapted to obviate buckling and distortion of the pans.

Another object is the provision of connection means associated with a bake pan unit and adapted to maintain flat positioning of the pan bottoms on the oven.

Another object is to provide a structure of the kind described in a simple and highly efficient manner.

These and other objects are attained by the means described herein and illustrated by the accompanying drawing, in which:

Fig. 1 is a fragmental elevational view of a side of a bake pan unit comprising the means of this invention.

Fig. 2 is an enlarged cross sectional view taken on line 2—2 of Fig. 1.

It has been common practice heretofore to utilize rivets, welds and the like, in connecting a group of pans for forming a bake pan unit of the type considered herein. The use of such means however has entailed this difficulty, that the expansion and contraction naturally resulting with the use of the pans, is not provided for, with the inevitable result that looseness and play has developed between the pans and their connecting means so that the efficiency, life and sanitary qualities of the pans of the unit so formed have been materially reduced. In addition to this, rigid connections of the kind described have resulted in buckling between the pans of the unit so that the bottoms of the pans did not rest uniformly upon the oven and, as is well known, this relationship is essential for assuring proper and even baking. Another means heretofore used to connect pans has been a metal strap formed with single or flat lugs lying beneath the end folds of the pans but which, although permitting contraction and expansion of the associated parts, yet had no secure and positive attachment to the pans so that the latter eventually became loosened and displaced.

These and other difficulties have been obviated by the means of the present invention which provide for a strap connecting the pans and having lugs associated therewith for positively engaging and clamping, in non-rigid relationship, the end folds normally provided in pans of this kind. The connection so formed is free of excessive rigidity whereby the various difficulties above enumerated are effectually avoided.

In greater detail and with reference to the drawing, a bake pan unit such as contemplated herein may comprise a plurality of bake pans 5 formed in a well known manner with triangular end folds 6. The top edges of the pans, as is likewise understood in this art, may be rolled upon continuous wires for forming the rolled edges 7. The pans may be substantially rectangular in shape for providing upright side and end walls.

A metal strap 8 embraces the group of pans and preferably extends around the outer walls of the unit immediately beneath the rolled ends 7 of the pans. The strap 8 may be formed with the beaded top edge 9 and with the corner loop or bumper members 10, said bead and bumper means both serving to protect the unit against wear and distortion resulting from the repeated and frequently forcible contact of the unit with other units and objects.

Adjacent the end of each pan, the strap 8 is provided with a pair of oppositely directed lugs 11 each of which extends rearwardly of the strap 8 adjacent an aperture 12 provided in the strap. As shown herein, said aperture results from the striking out of the lugs. The vertical width of each aperture 12 is greater than the width of the associated lug 11 as will be seen adjacent the left hand side.

The lugs 12 are each adapted to embrace a section of the end wall of the associated pan, that is, the section of the adjacent end fold 6. For this purpose, the lugs 12 are each introduced beneath one of said end folds and the extreme end 13 of each lug is projected outwardly of the overlying fold 6 through a suitable slit or opening 14 provided in the fold 6 at this point. It will be seen that the extreme ends 13 of the lugs may be pointed or tapered for facilitating their projection through the end folds 6, and furthermore, that the ends 13 of the lugs are adapted to be carried outwardly of the slits 14 and thereafter flattened against the outer face 15 of the strap 8 as seen in Fig. 2. The elongation of the lug permitting this overlying relationship of its end results from the extrusion of the lug occurring when the enclosed portion 16 of the fold 6 and the associated lug are pressed together under great pressure. It will also be seen in Fig. 2 that the embraced section 16 of the fold 6 is snugly received within the aperture 12 of the strap and that all of these parts lie in substantially the same plane so that there are no projections on the outer face of the strap. Furthermore, it will be seen in Fig. 2 that the body or intermediate portions of the lug 11, lying as they do beneath and within the outwardly-depressed portions 16 of the pan folds 6, carry the weight of the pans, while the interlocked ends 13 assure retention of this supporting relationship without impairing the contractive and expansive properties of the construction by excessive rigidity.

Modifications suggest themselves upon consideration of the means disclosed herein but these are believed to be comprised within the spirit and scope of the present invention.

What is claimed is:

1. A container or pan unit comprising a plurality of pans, a connecting strap embracing the pans and a lug on the strap adjacent each pan, said lug embracing a section of the adjacent pan wall and having its end projected outwardly through said section of wall for attaching the strap to the pans.

2. A bake pan unit comprising a plurality of aligned substantially rectangular pans, a connecting strap embracing the pans and provided with an aperture adjacent each pan end, and lugs on the strap extending one each behind one of said apertures and embracing a section of the adjacent pan wall, the end of each lug being projected outwardly through said section of wall and the adjacent one of said apertures and thereafter bent against the outer face of the strap whereby a locked connection free of excessive rigidity may be effected between the strap and pans.

3. A bake pan unit comprising a plurality of aligned substantially rectangular pans each provided with an overlap or fold member lying against an end of the pan, a connecting strap embracing the pans, and a lug struck from and extending rearwardly of said strap adjacent each fold member, each lug being inserted beneath said adjacent fold member and having its end projecting outwardly through said member and the adjacent strap aperture resulting from formation of the lug, the lug end being thereafter bent against the outer face of the strap for effecting between the strap and pans a locked connection free of excessive rigidity to provide for contraction and expansion of the unit.

4. A bake pan unit comprising a plurality of aligned substantially rectangular pans formed with end folds, a connecting strap embracing the pans, and a pair of oppositely-directed lugs struck from and extending rearwardly of said strap adjacent the ends of each pan, each lug being inserted beneath one of said end folds and having its end projected outwardly through said fold and the adjacent strap aperture resulting from formation of the lug, the lug end being thereafter bent against the outer face of the strap for effecting between the strap and pans a locked connection free of excessive rigidity to provide for contraction and expansion of the parts of the unit.

5. A bake pan unit comprising a plurality of aligned substantially rectangular pans formed with end folds, a connecting strap embracing the pans, a pair of oppositely-directed lugs struck from and extending rearwardly of said strap adjacent the ends of each pan, each lug being inserted beneath one of said end folds, the portion of said fold associated with the body or intermediate portion of the lug being depressed outwardly into the strap aperture resulting from formation of the associated lug, and said body portion of the lug lying within said depressed portion of the end fold for supporting the pan, the end portion of the lug being projected outwardly through the associated end fold and strap aperture and thereafter bent against the outer face of the strap for effecting between the strap and pans a locked connection free of excessive rigidity to provide for contraction and expansion of the parts of the unit.

6. A bake pan unit comprising two or more pans each provided with an overlap or fold member lying against an outer face of the pan, a connecting strap embracing the pans, and a lug extending rearwardly of said strap adjacent each of said fold members, each lug being inserted beneath the adjacent fold member and having its end projected outwardly through said fold member for providing a positive interlock between the strap and pans.

ELMER CHANDONIA.